United States Patent [19]

Shelley et al.

[11] E Re. 30,743

[45] Reissued Sep. 15, 1981

[54] THERMAL PRINTER-PLOTTER SYSTEM FOR MULTI-DIRECTIONAL PRINTING AND PLOTTING

[75] Inventors: David J. Shelley, Corvallis, Oreg.; Rick A. Warp, San Diego; Majid Azmoon, Poway, both of Calif.

[73] Assignee: Hewlett-Packard Company, Palo Alto, Calif.

[21] Appl. No.: 955,069

[22] Filed: Oct. 26, 1978

Related U.S. Patent Documents

Reissue of:

[64] Patent No.: 4,070,680
Issued: Jan. 24, 1978
Appl. No.: 716,033
Filed: Aug. 20, 1976

[51] Int. Cl.[3] ..... G01D 15/10; H05B 1/00

[52] U.S. Cl. ..... 346/76 PH; 346/1.1; 219/216

[58] Field of Search ..... 346/76 R, 76 PH, 155, 346/1; 219/216

[56] References Cited

U.S. PATENT DOCUMENTS 2,937,913 5/1960 Boyle ..... 346/29
3,611,419 10/1971 Blumenthal ..... 346/155
3,814,227 6/1974 Hurd et al. ..... 197/1 R
3,840,878 10/1974 Houston et al. ..... 346/76 R X
4,023,184 5/1977 Stillman, Jr. ..... 346/76 PH

FOREIGN PATENT DOCUMENTS 786024 11/1957 United Kingdom .
1450346 9/1976 United Kingdom .

*Primary Examiner*—George H. Miller, Jr.
*Attorney, Agent, or Firm*—Allston L. Jones

[57] ABSTRACT

A printer-plotter system is provided having a single horizontally movable, print-plot head comprising geometrically arranged thermal resistor elements which are processor-controlled for plotting continuous multi-directional line segments and for printing, while plotting, upper and lower case alphanumeric characters and punctuation characters in four orthogonal directions. Characters are printed in 5-columns-by-7-rows dot matrix form, with neighboring dots partly overlapping each other in order to impart a continuous or drawn appearance rather than a discontinuous dot appearance to the printed characters. The geometric arrangement of the head elements also provides for varying the width of line segments plotted along selected orthogonal directions.

12 Claims, 5 Drawing Figures

$\binom{E1}{P8}$ $\binom{E1}{P9}$ $\binom{E1}{P10}$ $\binom{E1}{P11}$ $\binom{E1}{P12}$ $\binom{E2}{P5}$ $\binom{E3}{P2}$ $\binom{E4}{P7}$ $\binom{E4}{P8}$ $\binom{E4}{P9}$ $\binom{E5}{P4}$ $\binom{E6}{P1}$ $\binom{E7}{P6}$ $\binom{E7}{P7}$ $\binom{E7}{P8}$ $\binom{E7}{P9}$ $\binom{E7}{P10}$

Figure 4

THERMAL PRINTER-PLOTTER SYSTEM FOR MULTI-DIRECTIONAL PRINTING AND PLOTTING

Matter enclosed in heavy brackets [ ] appears in the original patent but forms no part of this reissue specification; matter printed in italics indicates the additions made by reissue.

BACKGROUND OF THE INVENTION

The present invention relates generally to printer-plotter systems and, more particularly, to dot-matrix thermal printer-plotters. Thermal printer-plotters are known which have thermal resistive elements (dots) arranged in matrix form, each column and each row of matrix having multiple resistive elements.

However, to form the vertical portion of a character, the column elements of the matrix are sometimes energized simultaneously. This often results in non-uniformity of contrast between portions of the character formed by a given number of the matrix elements energized simultaneously and other portions of the character formed by a different number of simultaneously energized elements. This non-uniformity in contrast is caused by parasitic losses, such as are produced by a battery return lead and resistance, which reduce the amount of power supplied to each element as a function of the number of simultaneously energized elements.

To avoid this problem of non-uniformity in contrast associated with simultaneously energized elements, a printer-plotter with individually energizable print and plot elements is needed. Also, for purposes of compactness and simplicity, the elements should be arranged in a single print-plot head in such a manner that, to print a selected character, the same elements may be used to print the character in one direction as to print the character in other directions.

SUMMARY OF THE INVENTION

According to the illustrated preferred embodiment of the present invention, a print-plot system is provided having a central processing unit (CPU), a memory unit containing a stored program, and a printer-plotter unit with a print-plot head. The print-plot head comprises ten geometrically-arranged thermal resistive elements, one of which is used to plot lines and nine of which are used to print upper and lower case alphanumeric characters in four orthogonal directions, under program control.

The geometric arrangement of the character-printing elements enables these elements to be individually energized when printing a character, thereby eliminating the problem of non-uniformity of contrast associated with simultaneously energized contiguous printing elements. Any of the printing elements may be energized simultaneously with the plotting element in order to print characters while plotting selected line segments. The arrangement of the elements also diminishes the dot appearance of the printed characters and improves character appearance by printing the dots in slightly overlapped fashion. Furthermore, the arrangement of the elements provides for varying the thickness of a character or orthogonal line segments by selectively energizing one or more individual elements.

BRIEF DESCRIPTION OF THE DRAWINGS

FIG. 4 is a diagrammatic illustration of elements of the print-plot head of FIG. 3 used to print a character.

DESCRIPTION OF THE PREFERRED EMBODIMENT

Figure 1:
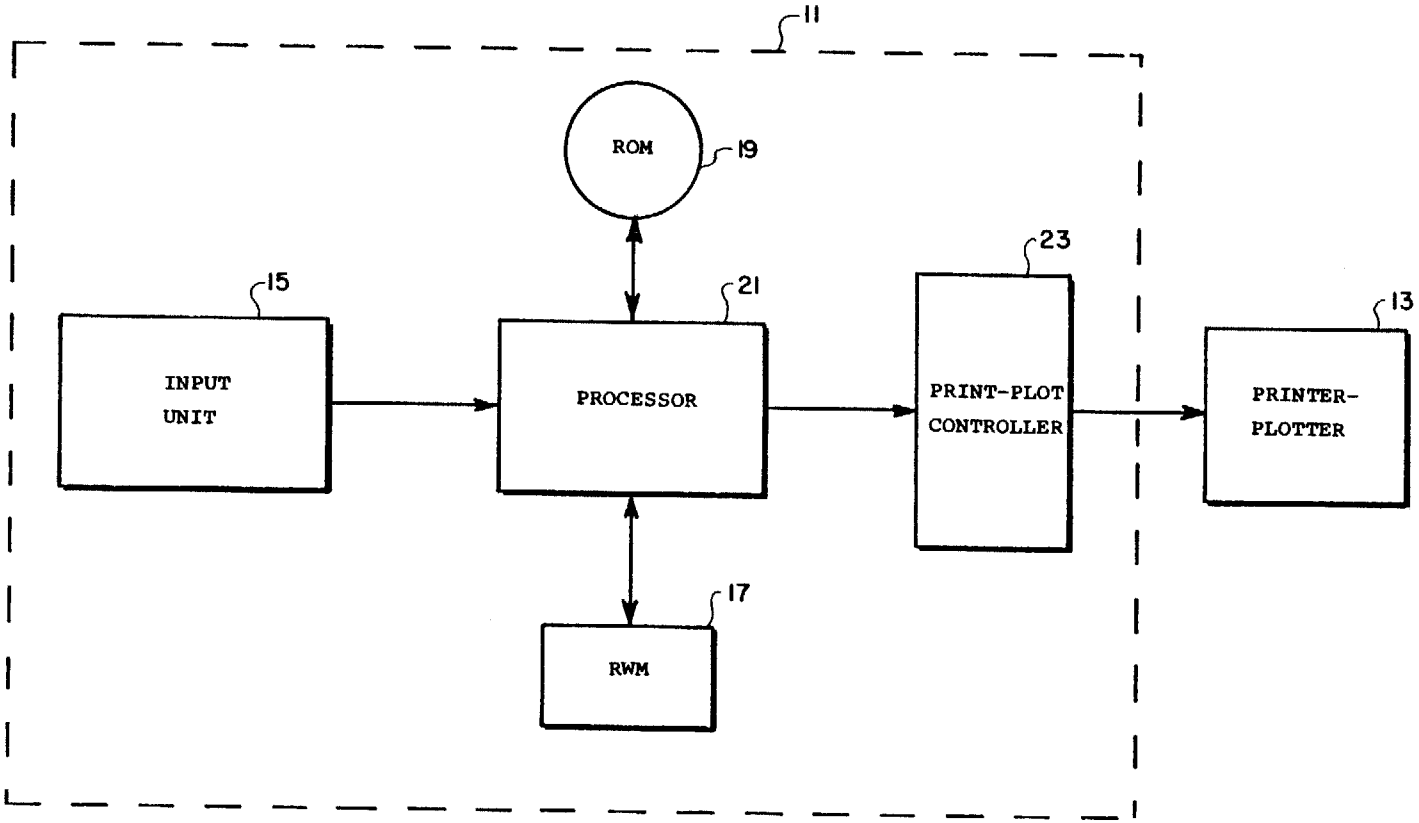
FIG. 1 is a block diagram of the printer-plotter system of the present invention.

FIG. 1 shows a printer-plotter system having a logic unit 11 and a printer-plotter unit 13. The logic unit 11 comprises an input unit 15 such as a keyboard, optical reader or magnetic tape device for entering data into the system, a read-write memory (RWM) unit 17, a read-only memory (ROM) unit 19 having a stored routine, a processing unit 21 and a print-plot controller 23. The processing unit 21 stores the data from input unit 15 into RWM 17, processes the stored data under control of the ROM routine, and applies the processed data via controller 23 to printer-plotter 13 for plotting and printing.

Figure 2:
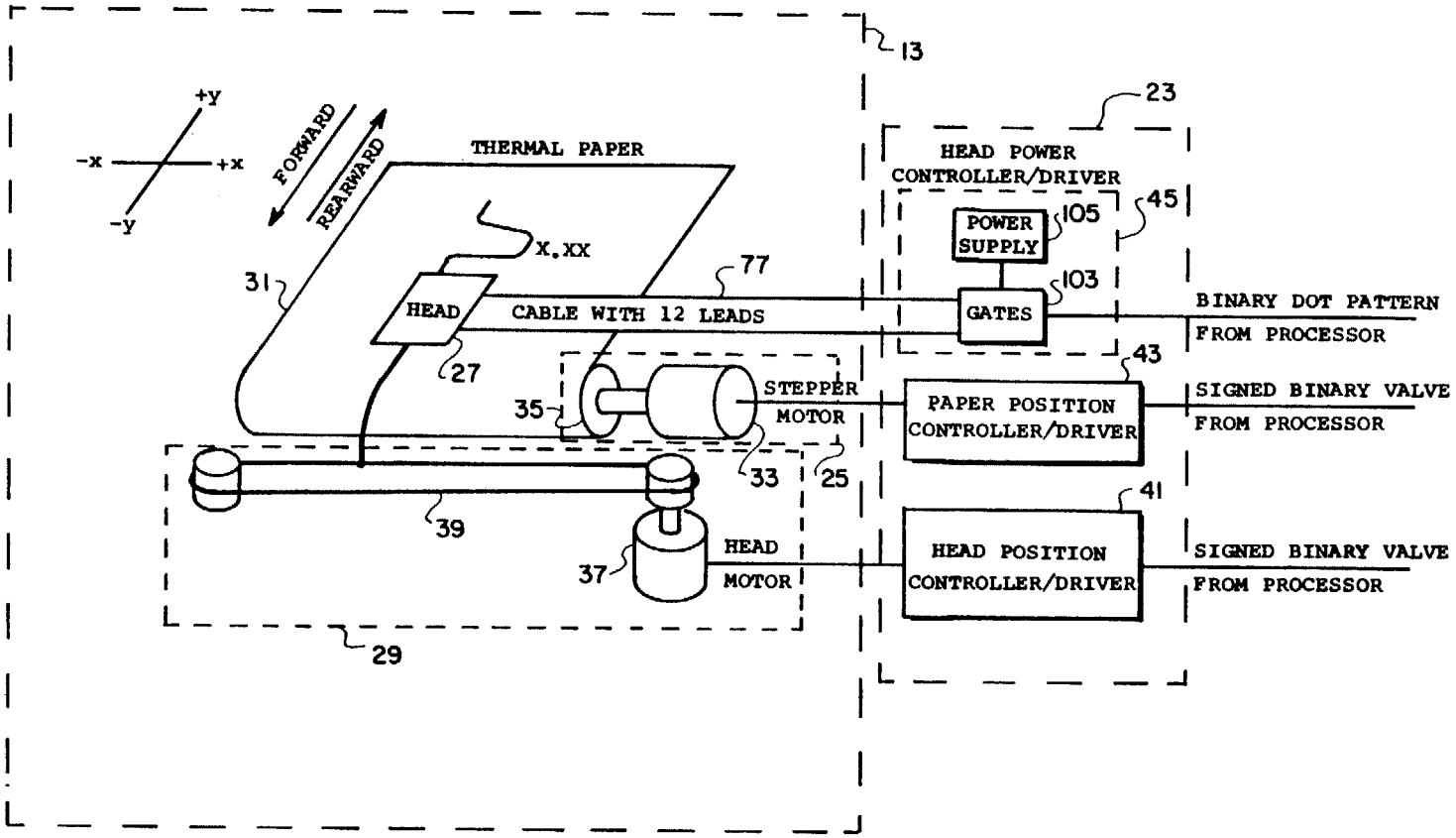
FIG. 2 is a combined perspective view and block diagram illustrating the printer-plotter and controller of the system of FIG. 1.

FIG. 2 shows the printer-plotter 13 comprising a web or paper drive unit 25, a print-plot head 27 engaging the web, and a coordinate actuator or head drive unit 29 for moving the print-plot head 27. The paper drive unit 25 includes a stepper motor 33 coupled to a platen 35 for moving paper 31 forward (from $+y$ to $-y$) or rearward (from $-y$ to $+y$). The head drive unit 29 includes a head motor coupled to head 27 by means of a guide wire 39 for moving the head 27 from left to right (from $-x$ to $+x$) or from right to left (from $+x$ to $-x$). FIG. 2 also shows print-plot controller 23 comprising a head position controller/driver 41, a paper position controller/driver 43, and a head power controller/driver 45. Upon application of a signed, binary value from processor 21 to head position controller/driver 41 (the sign of the binary value specifying the direction of movement of the head 27 and the magnitude of the binary value indicating the number of steps that the head 27 is to be moved), the controller/driver 41 converts the signed binary value to two signals with a $+90°$ phase delay between the two signals when the sign is negative, and to two signals with $-90°$ phase delay between the signals when the sign is positive, and applies the two signals to head motor 37. Head motor 37 moves head 27 a distance corresponding to the number of cycles of the signals, in the direction from $-x$ to $+x$ when the applied signals are out of phase by $+90°$, and from $+x$ to $-x$ when the applied signals are out of phase by $-90°$. In similar manner, a signed binary value applied by processor 21 to paper position controller/driver 43 causes controller/driver 43 to apply two signals with $+90°$ or $-90°$ phase delay between them to stepper motor 33. Stepper motor 33 rotates a sprocketed portion of platen 35, moving paper 31 a distance corresponding to the number of cycles of the applied signals. Paper 31 is moved forward ($+y$ to $-y$) when the signals applied to motor 33 are out of phase by $+90°$, and moved rearward ($-y$ to $+y$) when the signals applied to motor 33 are out of phase by $-90°$. A binary pattern of ten bits is applied, in parallel, by processor 21 to head power controller/driver 45 specifying the thermal elements of head 27 that are to be energized.

Figure 3:
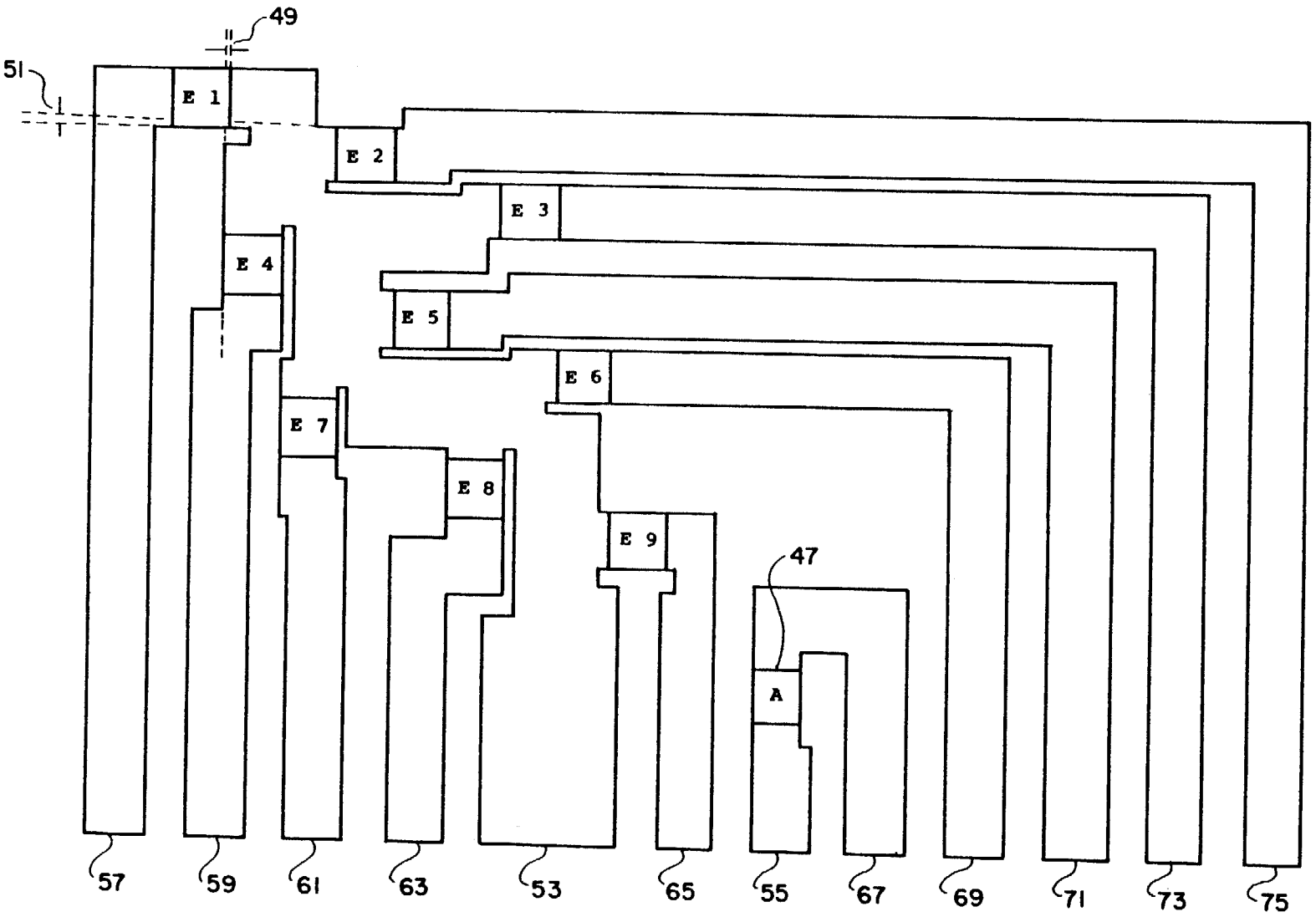
FIG. 3 is a top view of the elements of the print-plot head employed in the system of FIG. 1.

FIG. 3 shows a top view of the thermal resistive elements of head 27. (In an alternative embodiment of the present invention the thermal elements of the head may be arranged along a single diagonal.) Seven elements are used for printing upper and lower case characters, at least two elements used for printing punctuation characters, and one element 47 is used to plot lines. For example, when the head 27 is moved from left (−x) to right (+x), to print upper and lower case, characters E and e, thermal elements E1, E2, E3, E4, E5, E6 and E7 are used, to print a lower case character with a "descending portion" such as "p", elements E3, E4, E5, E6, E7, E8 and E9 are used, and to print a punctuation mark such as a comma, elements E7, E8 and E9 are used. Each printing element partly overlaps its neighboring element in a column-wise and row-wise fashion as indicated by reference numerals 49 and 51 of FIG. 3. This overlapping arrangement permits the printing of contiguous, partly-overlapping dots, forming characters having a non-dot-like appearance. The elements are connected to twelve leads, one lead being a ground lead 53 common to elements E1–E9, nine lead being conductor leads 57–63, 65 and 69–75, each connected to one of the nine elements E1–E9, and one grounded lead 55 and one conductor lead 67 connected to plot element 47. The twelve leads to the head 27 are, in turn, connected to head power controller/driver 45 of printer-plotter controller 23 via a flexible cable 77. Processor 21, under control of the routine shown in FIG. 5 and Table 2 following, moves the head 27 or paper 31, or both, to a selected position and applies a binary pattern to head 27, energizing selected elements to plot a point or to print one or more points as part of a character.

FIG. 4 shows the elements E1–E7 used to print the character "E," and the particular move or position of the head (p1 being a first position, p2 being a second position, and so on) at which each element is energized. The elements E8 and E9 are not used to print portions of the E, instead, these two elements are used to print punctuation marks and the lower portions of lower-case characters when such characters are oriented in the same direction as the E. For example $$\begin{pmatrix} E6 \\ p1 \end{pmatrix}$$

means that at an initial positioning of head 27 element E6 is energized to form a portion of character E, $$\begin{pmatrix} E3 \\ p2 \end{pmatrix}$$

means that at the next positioning of the head (i.e., at head position two), element E3 is energized to form another portion of the E, $$\begin{pmatrix} E4 \\ p7 \end{pmatrix} \begin{pmatrix} E7 \\ p7 \end{pmatrix}$$

means that at head position seven, elements E4 and E7 are energized to form two other portions of the E, and so on. Note that at head position three, elements E8 is in position for forming a punctuation character or lower portion of a lower-case character (if such a character were needed) and, hence, is not energized to form a portion of the E. Table 1 shows the element used to print upper-case character "P," punctuation character "," and lower-case character "p."

TABLE 1

| Orientation of character | Example of character orientation | Character orientation (Cartesian) | Direction of head movement | Direction of paper movement | Element used to form character in order of use, from left to right | Element used to form descender portion (in order of use) |
|---|---|---|---|---|---|---|
| First orthogonal | P, | +y to −y | −x to +x | No movement | E6,E3,E5,E2, E7,E4,E1 | E9,E8 |
| Second orthogonal | | −y to +y | +x to −x | No movement | E4,E7,E5,E8, E3,E6,E9 | E1,E2 |
| Third orthogonal | | −x to +x | No movement | +y to −y | E1,E2,E3,E4, E5,E7,E8 | E6,E9 |
| Fourth orthogonal | | +x to −x | No movement | −y to +y | E9,E8,E7,E6, E5,E3,E2 | E4,E1 |
| First orthogonal | P | +y to −y | −x to +x | No movement | E9,E6,E3,E8, E5,E7,E4 | None |

Figure 5:
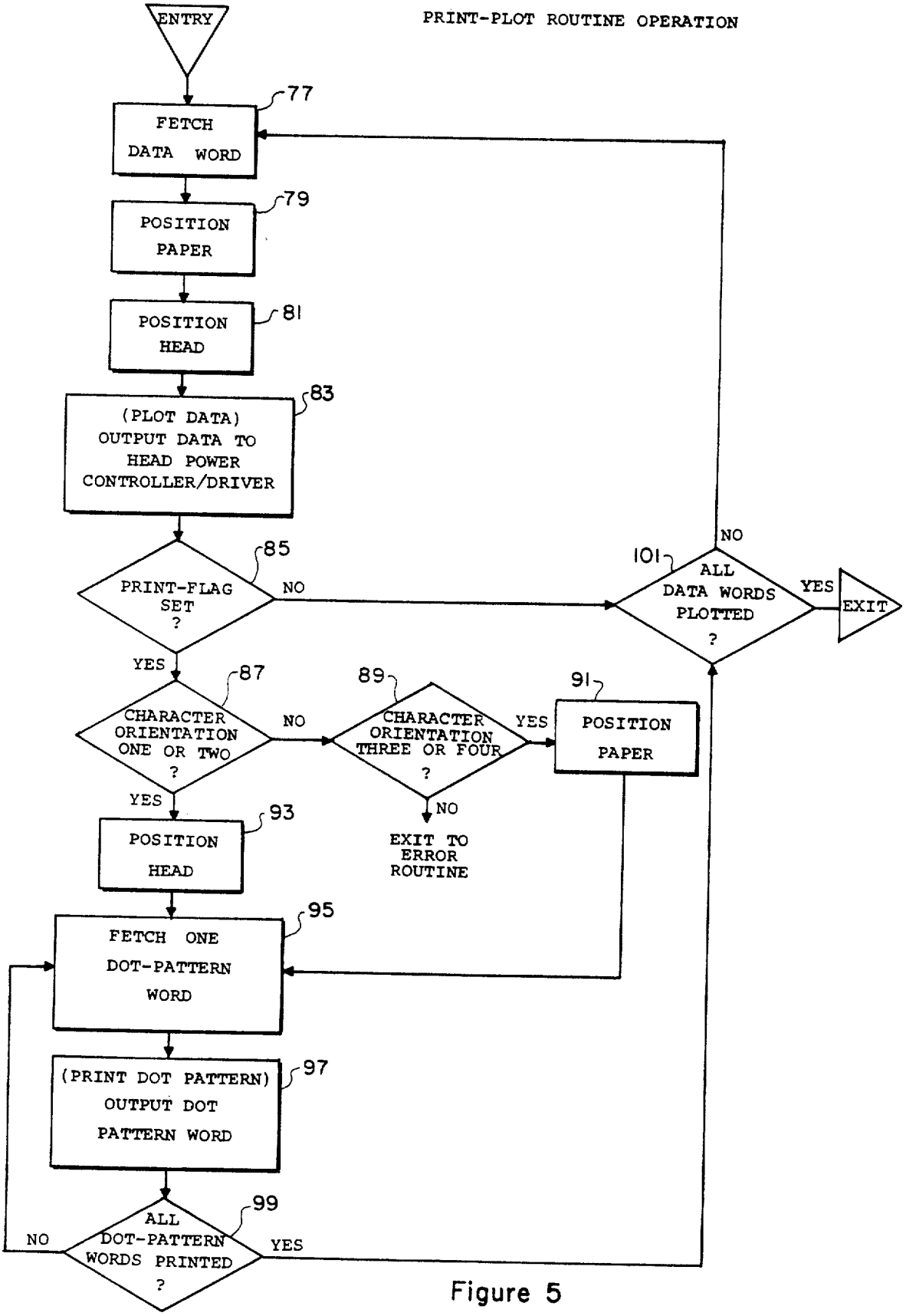
FIG. 5 is a logic flow diagram of a routine stored in a ROM of the system of FIG. 1, illustrating one mode of operation of the system.

A flow chart of the operations performed by processor 21 under control of the routine stored in ROM 19 (FIG. 1) is shown in FIG. 5. Each block of the flow chart represents an operation performed by processor 21. For a given sequence of input data received and stored by logic unit 11, or generated by processor 21 (pursuant to calculation operation) and stored in RWM 17 for plotting and printing, the print-plot routine as shown by block 77 accesses the first data word to be plotted, positions the paper and head as shown by blocks 79 and 81, and plots the contents of the accessed data word. As shown by block 83, plotting is achieved by applying the accessed data to head power controller/driver 45 (FIG. 2) where the data is used to gate power from a power supply 105 to plot element 47 of head 27. Following the plotting operation as block 85 shows, a test is made to determine if printing is to be performed. If no printing is to be performed (indicated by a print flag not having been preset), control is transferred to block 101. If a print flag has been present indicating that character data are to be printed, the orthogonal orientation of the character is determined as shown by blocks 87 and 89, and head 27 or paper 31 is moved to a selected coordinate as shown by blocks 93 and 91, causing selected elements of the head to occupy selected positions over the paper 31 corresponding to the data word to be printed. To accomplish the head and paper movement indicated by blocks 93 and 91, for a given character orientation determined from blocks 87 and 89, signed binary values are applied to head-position and paper-position controller/drivers 41, 43. Bit patterns (dot patterns in binary form) of alphanumeric characters printable by the system are pre-stored in word groups in ROM 19, each word group containing the dot (bit) pattern corresponding to one character. For a given character stored in RWM 17, the group of words from ROM 19 containing the dot pattern corresponding to the stored character are accessed. This access operation is shown by block 95, after which the contents of each word are applied to head power controller/driver 45 (FIG. 2) as shown by block 97. As shown by gates 103 and power supply 105 of FIG. 2, the contents of each dot-pattern word serve to gate power from power supply 105 to those elements of the head for which there is a matching "1" bit in the dot-pattern. As block 99 shows, after each dot-pattern word is provided, control is returned to blocks 95 and 97 for successive dot-pattern words to be output. When all of the dot-pattern words (preselected for annotating a plotted data value) have been printed, control is transferred to block 101 which, in turn, returns control to block 77 if additional data values remain to be plotted, or terminates the print-plot operation if no data values remain to be plotted. To plot lines having a selected thickness, a plot element 47 of selected size may be used, or individual elements may be energized selectively to produce, along a selected orthogonal direction, a line made up of a desired number of contiguous dots. To print characters having a selected thickness, selected dot patterns may be used. Table 2 shows a listing of the individual instructions of the print-plot routine.

TABLE 2

Print-Plot Routine

| Sequence no. | ROM Address (in octal) | Object code | Subroutine label | Operation code (instructions) | Remarks |
|---|---|---|---|---|---|
| 0674 | 03054 | 001055 | NXTPO | DEF *+1-, | |
| 0675 | 03055 | 001346 | | LDA DEFG | CHECK DECELERATION FLAG |
| 0676 | 03056 | 072402 | | SZA *+2 | SET DECELERATE |
| 0677 | 03057 | 066275 | | JMP DECEL | |
| 0678 | 03060 | 005317 | | LDB CHMOD | |
| 0679 | 03061 | 014043 | | CPB 01 | ACCELERATE? |
| 0680 | 03062 | 066262 | | JMP ACCEL | YES |
| 0681 | 03063 | 001353 | | LDA SCNTR | |
| 0682 | 03064 | 072402 | | SZA *+2 | TIME TO PRINT |
| 0683 | 03065 | 066252 | | JMP KPSLW | NO, JUST SLEW |
| 0684 | 03066 | 014106 | | CPB 07 | CRUISE? |
| 0685 | 03067 | 066212 | | JMP LSTCH | YES |
| 0686 | 03070 | 024123 | | ADB N4 | |
| 0687 | 03071 | 176002 | | SBP *+2 | |
| 0688 | 03072 | 066145 | | JMP FETDT | |
| 0689 | 03073 | 024117 | | ADB N2 | |
| 0690 | 03074 | 176002 | | SBP *+2 | |
| 0691 | 03075 | 066210 | | JMP SPCE | |
| 0692 | 03076 | 001322 | NEWCH | LDA TBUFF | FETCH NEW CHARACTER |
| 0693 | 03077 | 072005 | | RZA FETAS | IF #0 THEN DO CHAR. |
| 0694 | 03100 | 045317 | | ISZ CHMOD | SET CVHMOD = 7 |
| 0695 | 03101 | 000141 | | LDA M12 | SET |
| 0696 | 03102 | 031354 | | STA CLCNT | CRUISE COUNT |
| 0697 | 03103 | 066212 | | JMP LSTCH | AND JUMP |
| 0698 | 03104 | 035322 | FETAS | STB TBUFF | CLEAR TBUFF |
| 0699 | 03105 | 050055 | | AND 0177 | MASK OFF EXTRA BITS |
| 0700 | 03106 | 010074 | | CPA EOTCH | EOT? |
| 0701 | 03107 | 066124 | | JMP EOTPT | YES |
| 0702 | 03110 | 010051 | | CPA 017 | HANDSHAKE? |
| 0703 | 03111 | 066126 | | JMP HSPRT | YES |
| 0704 | 03112 | 020124 | | ADA N40 | ADD OFFSET |
| 0705 | 03113 | 030001 | | STA B | MULTIPLY |
| 0706 | 03114 | 176000 | | SAL 1 | BY |
| 0707 | 03115 | 024000 | | ADB A | 3 |
| 0708 | 03116 | 000002 | | LDA P | |

```
03117 050061        AND 0176K
03120 022454        ADA BLKAD
03121 024000        ADB A          ADD TO TABLE OFFSET
03122 035355 STCAD  STB CLDAD      CURR. LETTER DOT ADDR.
03123 066130        JMP MODCG      CHANGE MODE AND CONTINUE
03124 006763 EDTPT  LDB EDTAD
03125 066122        JMP STCAD
03126 006764 HSPRT  LDB HSAD
03127 066122        JMP STCAD
03130 000070 MODCG  LDA 03         SET
03131 031317        STA CHMOD      CHMOD TO 3
03132 000125        LDA N5         SET
03133 031354        STA CLCNT      FOR 5 COLUMNS
03134 000135        LDB P30
03135 040471        JSM DCHEK      CHECK D PARAMETER
03136 024115        ADB M10
03137 024115        ADB M10
03140 024115        ADB M10
03141 026330        ADB MAK1       CALCULATE START OF MASK
03142 035356        STB MSKST
03143 000042        LDA OCT0
03144 031360        STA FLOP       INITIALIZE FLOP
03145 045354 FETDT  ISZ CLCNT      INCREMENT CLCNT
03146 066150        JMP *+2        IF #0 CONTINUE
03147 045317        ISZ CHMOD      IF =0 THEN SET FOR SPACE
03150 105355        LDB CLDAD,I
03151 001360        LDA FLOP
03152 170140        CMA
03153 031360        STA FLOP
03154 072003        RZA *+3        SKIP IF -1
03155 174707        RBR 8          PUT BITS IN LEFT BYTE
03156 045355        ISZ CLDAD      INCREMENT CLDAD AND CONTINUE
03157 174507        SBR 8
03160 077003        SLB *+3        SKIP IF REFERENCED TO TOP
03161 024113        ADB N1         CLEAR TOP OR BOTTOM BIT
03162 174601        SBL 2
03163 174500        SBR 1
03164 040471        JSM DCHEK      CHECK D PARAMETER
03165 000000        NOP
03166 066203        JMP SKPRV      D= 1 OR 2
03167 000000        NOP            ELSE
03170 000150        LDA M9         SET
03171 031361        STA RVCNT      REVERSE COUNT
03172 000042        LDA OCT0
03173 174600        SBL 1          INITIALIZE REVERSE
03174 174533 CONRV  SBR 1
03175 170600        SAL 1
03176 077002        SLB *+2
03177 020043        ADA D1
03200 045361        ISZ RVCNT
03201 066174        JMP CONRV
03202 030001        STA B
03203 040471 SKPRV  JSM DCHEK      CHECK D PARAMETER
03204 066217        JMP PRT
03205 042401        JSM SWAP
03206 066217        JMP PRT
03207 042401        JSM SWAP
03210 045317 SPCE   ISZ CHMOD
03211 066216        JMP ZEROS
03212 045354 LSTCH  ISZ CLCNT
```

```
0769  03213 066216        JMP ZEROS     STILL CRUISING
0770  03214 045346        ISZ DEFG      DONE CRUISING, DECELERATE
0771  03215 045345        ISZ OTEMP
0772  03216 004042 ZEROS  LDB OCT0      DO COLUMN OF ZEROS
0773  03217 135337 PRT    STB BUFPT,I
0774  03220 004042        LDB OCT0
0775  03221 031356        LDA MSKST
0776  03222 031357        STA MSKPT
0777  03223 066231        JMP MK2
0778  03224 101337 MK1    LDA BUFPT,I
0779  03225 151357        AND MSKPT,I
0780  03226 060001        IOR B
0781  03227 030001        STA B
0782  03230 045357        ISZ MSKPT
0783  03231 045337 MK2    ISZ BUFPT
0784  03232 000113        LDA N1
0785  03233 111337        CPA BUFPT,I
0786  03234 042240        JSM MK3
0787  03235 111357        CPA MSKPT,I
0788  03236 056244        JMP DONE
0789  03237 066224        JMP MK1
0790  03240 030205 MK3    LDA BUFST
0791  03241 031337        STA BUFPT
0792  03242 000113        LDA N1
0793  03243 170201        RET 1
0794  03244 174603 DONE   SBL 4          POSITION BITS FOR
0795  03245 035123        STB HEDWD     PRINTING AND STORE
0796  03246 000217        LDA PRTST     SET
0797  03247 031323        STA STROB     STROB
0798  03250 000123        LDA N4        RESET
0799  03251 031353        STA SCNTR     SCNTR
0800  03252 000102 KPSLW  LDA 06
0801  03253 030001        STA B
0802  03254 045353        ISZ SCNTR
0803  03255 066307        JMP OTPT
0804  03256 174600        SBL 1
0805  03257 011317        CPA CHMOD
0806  03260 066313        JMP OTPT1
0807  03261 066307        JMP OTPT
0808  03262 045345 ACCEL  ISZ OTEMP      INCREMENT OTEMP
0809  03263 045347        ISZ TACCT     IF TACCT #0 THEN
0810  03264 066307        JMP OTPT      KEEP ACCELERATING
0811  03265 004220        LDB SLWCT     ELSE DO ONE SAMPLE OF SLEW
0812  03266 035345        STB OTEMP
0813  03267 024043        ADB 01
0814  03270 000042        LDA OCT0      SET
0815  03271 031353        STA SCNTR     SCNTR TO PRINT
0816  03272 000102        LDA 06        SET CHMOD TO FETCH
0817  03273 031317        STA CHMOD     NEW CHARACTER
0818  03274 066313        JMP OTPT1     OUTPUT
0819  03275 055345 DECEL  DSZ OTEMP     IF STILL DECELERATING
0820  03276 066307        JMP OTPT      OUTPUT
0821  03277 000042        LDA OCT0      ELSE
0822  03300 031111        STA USER      CLEAR USER
0823  03301 031346        STA DEFG      CLEAR DEFG
0824  03302 011320        CPA DEFFG
0825  03303 165127        JMP INRET,I
0826  03304 001112        LDA XPRES
0827  03305 031316        STA LSTCX
0828  03306 165127        JMP INRET,I
0829  03307 045345 OTPT   LDB OTEMP
0830  03310 001323        LDA STROB
```

```
0831  03311 072402          SZA ++2
0832  03312 044001          ISZ B
0833  03313 040471 OTPT1    JSM OCHEK
0834  03314 066324          JMP MTROT
0835  03315 056323          JMP *+6
0836  03316 173301          SOC *+1,S
0837  03317 000064          LDA SNBIT
0838  03320 060001          IOR B
0839  03321 030001          STA B
0840  03322 173602          SOS *+2,C
0841  03323 174607          SBL B
0842  03324 034000 MTROT    STB A
0843  03325 031200          STA XYOUT
0844  03326 141121          JSM OUTXY,I
0845  03327 165127          JMP INRET,I
0847  03330 003331 MAK1     DEF *+1
0848  03331 000001          OCT 1,10,100,2,20,200,4,40,400,-1
      03332 000010
      03333 000100
      03334 000002
      03335 000020
      03336 000200
      03337 000004
      03340 000040
      03341 000400
      03342 177777
0849  03343 000400          OCT 400,200,100,40,20,10,4,2,1,-1
      03344 000200
      03345 000100
      03346 000040
      03347 000020
      03350 000010
      03351 000004
      03352 000002
      03353 000001
      03354 177777
0850  03355 000400          OCT 400,40,4,200,20,2,100,10,1,-1
      03356 000040
      03357 000004
      03360 000200
      03361 000020
      03362 000002
      03363 000100
      03364 000010
      03365 000001
      03366 177777
0851  03367 000001          OCT 1
0852  03370 000002 MSK2     OCT 2
0853  03371 000004 MSK3     OCT 4
0854  03372 000010 MSK4     OCT 10,20
      03373 000020
0855  03374 000040 MSK6     OCT 40
0856  03375 000100 MSK7     OCT 100
0857  03376 000200 MSK8     OCT 200,400,-1
      03377 000400
      03400 177777
```

We claim:

1. A system for forming visual output [manifestations] *images* on a web, comprising:

head means having a *non-linear* plurality of print elements engaging said web, each element being located at the intersection of first and second [coordinate positions] *coordinates of position* in the head, with no [element occupying] *two elements having* the same first coordinate [position] and no [element occupying] *two elements having* the same second coordinate [position];

drive means coupled to at least one of the web and the head means for providing relative motion [of] *between* the head means [with respect to] *and* the web along *at least one of the* two orthogonal coordinates *of the web*; and logic means disposed to receive data and coupled to the drive means and to the *print elements of the* head means for forming visual output [manifestations] *images* on the web in one of four directions along the two orthogonal coordinates *of the web* by causing the drive means to move at least one of the web and head means to a selected position *in selected steps* and energizing selected *print* elements of the head means to form selected portions of the visual output [manifestations] *images* in response to said data *at each position of the head means relative to the web.*

2. The system as in claim 1 wherein each first coordinate of the print elements is a row coordinate and each second coordinate is a column coordinate, the print elements being symmetrically located about at least one of two substantially 45° diagonals.

3. The system as in claim 1 wherein the logic means includes a stored routine for producing alphanumeric characters, the web is thermally sensitive paper, and the print elements comprise at least nine thermal resistive elements.

4. The system as in claim 1 wherein the head means includes a plot element for plotting lines on the web.

5. The system as in claim 2 wherein the print elements are aligned in overlapping contiguity along the coordinates, this arrangement being effective for producing contiguous partly-overlapping marks on the web.

6. The system as in claim 5 wherein the drive means includes a web drive means and a head drive means, and the logic means controls [the head means,] the head drive means, the web drive means and [controls] the energizing of selected numbers of those *print* elements contiguously aligned along a selected coordinate, to produce line segments in the direction of the selected coordinate having thickness related to the number of elements energized.

7. A method of forming output [manifestations] *images having one or more rows and columns* on a web using a movable head with a *non linear* plurality of print elements *thereon* to form portions of each output [manifestation] *image* in one of four orthogonal directions, the method comprising the steps of:

selecting a number of *print* elements to be energized;

positioning one of the head and web with the selected *print* elements located over selected portions of the output [manifestation] *image* to be formed in such a manner that at each positioning no more than one *print* element is located over a column of the output [manifestation] *image* to be printed, and no more than one *print* element is located over a row of the output [manifestation] *image* to be printed; and energizing the selected *print* elements to form portions of the output [manifestation] *image* in one or four orthogonal directions.

8. The method of claim 7 where the step of positioning includes the steps of moving the head in a first direction to produce output [manifestations] *images* oriented in said first direction, and moving the head in a second direction to produce output [manifestations] *images* oriented in said second direction.

9. The method of claim 7 where the step of positioning further includes the steps of moving the web in a third direction to produce output [manifestations] *images* oriented in a fourth direction opposite to said third direction, and moving the web in a fourth direction to produce output [manifestations] *images* oriented in the third direction.

10. The method of claim 7 where the movable head includes a plot element for forming lines on the web in any selected direction and the method includes the steps of:

selecting the plot element to be energized;

positioning one of the head and web such that the plot element is located over a segment of the line to be formed; and energizing the plot element to form the line segment in the selected direction.

[11. A print head comprising a cluster of a selected number of print elements disposed on and about at least two diagonals for forming output manifestations on a web in any of four orthogonal directions, such elements being located at the intersection of first and second coordinate positions, with no element occupying the same first coordinate position and no element occupying the same second coordinate position.]

[12. The print head as in claim 11 wherein each first coordinate of the print element is a row coordinate and each second coordinate is a column coordinate.]

[13. The print head as in claim 11 wherein the print elements are aligned in overlapping contiguity along the coordinates for producing partly-overlapping contiguous output manifestations on the web.]

[14. The print head as in claim 11 wherein the print elements are disposed having independent conductor leads and a common ground lead.]

[15. The print head as in claim 11 wherein a first group of the selected number of print elements are used for printing output manifestations in the form of upper case characters, a second group of said elements are used for printing lower case characters, and a third group of said elements are used to print punctuation characters.]

[16. The print head as in claim 11 including a plot element disposed externally to the cluster of print elements for plotting lines.]

17. A system for forming visual output [manifestations] *images* on a web, comprising:

head means having a *non-linear* plurality of print elements and a plot element engaging said web, each element being located at the intersection of first and second [coordinate positions] *cartesian coordinates of position* in the head, with no [element occupying] *two elements having* the same first coordinate [position] and no [element occupying] *having* the same second coordinate [position];

drive means coupled to at least one of the web and the head means for providing relative motion [of] *between* the head means [with respect to] *and* the web along *at least one of the* two orthogonal coordinates *of the web*; and logic means disposed to receive data and coupled to the drive means and to the head means for substantially simultaneously printing and plotting visual output [manifestations] *images* on the web in one of four directions along the two orthogonal coordinates *of the web* by causing the drive means to move at least one of the web and head means to a selected position *in selected steps* and energizing selected *print* elements of the head means to form selected portions of the visual output [manifestations] *images* in response to said data *at each position of the head means relative to the web.*

18. A method of substantially simultaneously printing and plotting visual output [manifestations] *images having one or more rows and columns* on a web using a movable head with a *non-linear* plurality of print elements and a plot element *thereon* to form portions of each output [manifestation] *image* in one of four orthogonal directions, the method comprising the steps of:

selecting a number of *print* elements to be energized;

positioning one of the head and web with the selected *print* elements located over selected portions of the output [manifestation] *image* to be formed in such a manner that at each positioning no more than one *print* element is located over a column of the output [manifestation] *image* to be printed, and no more than one *print* element is located over a row of the output [manifestation] *image* to be printed; and energizing the selected *print* elements to form portions of the output [manifestation] *image* in one of four orthogonal directions.

[19. A print head comprising a plot element and a cluster of a selected number of print elements disposed on and about at least two diagonals for printing and plotting substantially simultaneously and forming output manifestations on a web in any of four orthogonal directions, such elements being located at the intersection of first and second coordinate of positions, with no element occupying the same first coordinate position and no element occupying the same second coordinate position.]

* * * * *

UNITED STATES PATENT AND TRADEMARK OFFICE

CERTIFICATE OF CORRECTION

PATENT NO. : Re. 30,743

DATED : September 15, 1981

INVENTOR(S) : David J. Shelley et al.

It is certified that error appears in the above—identified patent and that said Letters Patent is hereby corrected as shown below:

Column 13, line 5, after "second" insert -- cartesian --.

Column 14, line 63, after "no" insert -- two elements --.

Signed and Sealed this

Fifth Day of January 1982

[SEAL]

*Attest:*

*Attesting Officer*

GERALD J. MOSSINGHOFF

*Commissioner of Patents and Trademarks*